United States Patent [19]

Nakamura

[11] 4,211,996

[45] Jul. 8, 1980

[54] ERROR CORRECTION SYSTEM FOR DIFFERENTIAL PHASE-SHIFT-KEYING

[75] Inventor: Katsuhiro Nakamura, Tokyo, Japan

[73] Assignee: Nippon Electric Co., Ltd., Tokyo, Japan

[21] Appl. No.: 926,062

[22] Filed: Jul. 19, 1978

[30] Foreign Application Priority Data

Jul. 19, 1977 [JP] Japan .................................. 52-87013
Jul. 19, 1977 [JP] Japan .................................. 52-87014
Jul. 19, 1977 [JP] Japan .................................. 52-87015

[51] Int. Cl.² .......................................... G06F 11/12
[52] U.S. Cl. ........................................ 371/37; 371/43
[58] Field of Search ........... 340/146.1 AQ, 146.1 AL; 325/41

[56] References Cited

U.S. PATENT DOCUMENTS

| | | | |
|---|---|---|---|
| 3,891,959 | 6/1975 | Tsuji et al. | 340/146.1 AQ |
| 3,990,009 | 11/1976 | Lentz | 325/41 |
| 4,035,767 | 7/1977 | Chen et al. | 340/146.1 AQ |
| 4,128,828 | 12/1978 | Samejima et al. | 340/146.1 AQ |

OTHER PUBLICATIONS

Forney, Jr. and Bower, A High–Speed Sequential Decoder: Prototype Design and Test, IEEE Trans. on Comm. Technology, vol. COM-19, No. 5, Oct. 1971, pp. 821-835.
Chen and Rutledge, Error Correcting Codes for Satellite Comm. Channels, IBM J. Res. Develop., Mar. 1976, pp. 168-175.

Primary Examiner—Charles E. Atkinson
Attorney, Agent, or Firm—Sughrue, Rothwell, Mion, Zinn and Macpeak

[57] ABSTRACT

An error correcting system for DPSK is comprised of an encoder unit, a decoder unit and a transmission medium disposed between the encoder and decoder units. The encoder includes a differential encoder for differentially encoding an input data sequence, an error correcting encoder for adding a check digit sequence to the differentially encoded data sequence, and a differential decoder for differentially decoding the data sequence added with the check digit sequence. The decoder unit includes a differential encoder for differentially encoding a received data sequences, an error correcting decoder for correcting error digits contained in the differentially encoded received data sequence, and a differential decoder for differentially decoding the output data sequence from the error correcting decoder. The transmission medium typically includes a differentially encoded phase-shifting-keying modulator unit and a differentially encoded phase-shift-keying demodulator unit.

3 Claims, 7 Drawing Figures

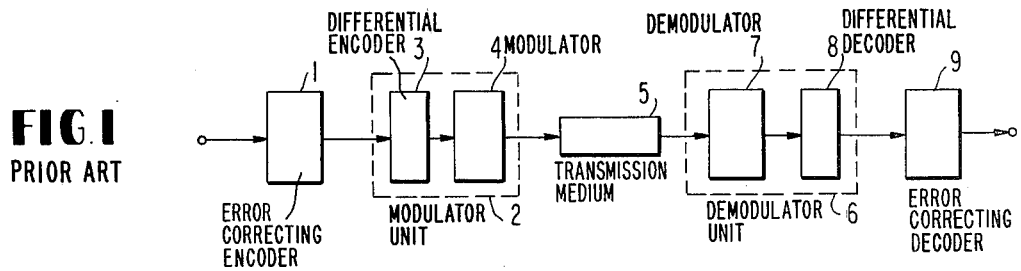
FIG.1 PRIOR ART
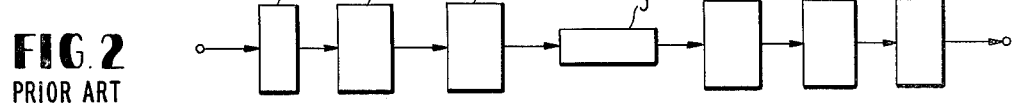
FIG.2 PRIOR ART
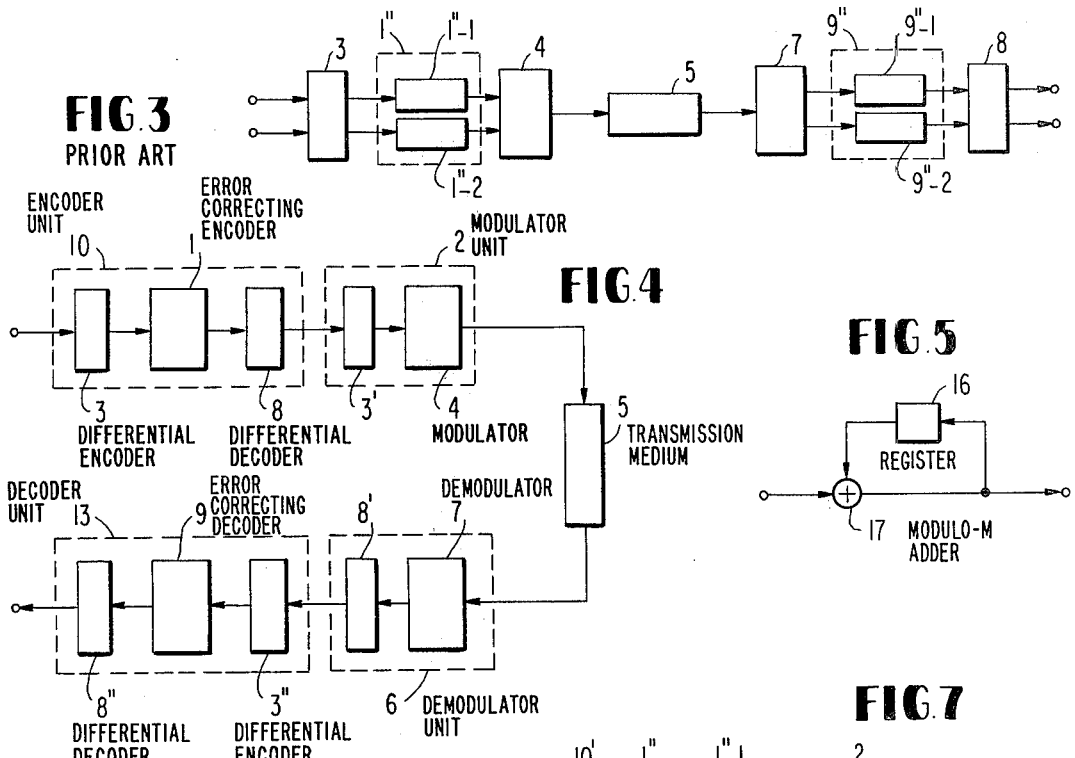

ERROR CORRECTION SYSTEM FOR DIFFERENTIAL PHASE-SHIFT-KEYING

BACKGROUND OF THE INVENTION

The present invention relates to an automatic error detection and correction system suited for differential phase-shift-keying (DPSK) data transmission systems.

To adapt an error correction system to a DPSK system, the structure illustrated in FIG. 1 is conventionally employed. In FIG. 1, after check digits have been added at an error correcting encoder 1 to data to be transmitted, the data are differentially encoded in a differential encoder 3 included in a modulator unit 2 so that they are modulated onto a carrier wave at a modulator 4 and then transmitted to a transmission (or storage) medium 5. The data received through the transmission medium 5 are demodulated first by a demodulator 7 in a demodulator unit 6. After the data have been differentially decoded in a differential decoder 8 of the modulator unit 6, the errors introduced during the transmission are corrected in an error correcting decoder 9 to restore correct transmission data. However, if one digit error (corresponding to one phase-encoded data) is introduced in the transmission medium 5, the error is expanded in the differential decoder 8 with the result that errors of two successive phase-encoded data are given to the error correcting decoder 9.

The structure of FIG. 1 therefore requires an encoder and a decoder capable of correcting more errors than those introduced during the transmission through the transmission medium 5, and unavoidably complicates the encoder and decoder.

For details of such a prior art shown in FIG. 1, reference is made to FIG. 5 of the article by G. David Forney, Jr., and Edward K. Bower, entitled "A High-Speed Sequential Decoder: Prototype Design and Test," IEEE Transactions on Communication Technology, Vol. COM-19, No. 5, October issue, 1971, pp. 821–824.

To avoid such a disadvantage, a modified structure illustrated in FIG. 6(b) of the Forney, Jr. et al. article has been proposed. Such structure is shown schematically in FIG. 2 of the accompanying drawings. The error correcting encoder 1 and the differential encoder 3 are interchanged in sequence and the error correcting decoder 9 and the differential decoder 8 are also interchanged so that the error correcting and decoding can be carried out so that the errors introduced in the transmission medium 5 are not expanded. However, in this modified structure, the error correction must be performed before carrying out the differential decoding. The error correction therefore must be carried out under such state that there is no coincidence in phase references between the transmitter and the receiver.

To solve this problem, another structure effectively adaptable to a quadri-phase-shift-keying (QPSK) system has been proposed in FIG. 7(a) of the Forney, Jr. et al. article. Its simplified structure is shown in FIG. 3 of the attached drawings. The feature of the structure lies in employing two binary error correcting codes, independently. In more detail, one phase (-encoded) data is represented by 2 bits as shown by the two input and output lines. Like reference numerals denote like structural elements in FIG. 1.

However, either structure of FIG. 2 or FIG. 3 cannot be adopted if the error correcting encoder 1 and the modulator unit 2, and the error correcting decoder 9 and the demodulator unit 6 are not formed in the same structural units, respectively. Even if they are formed in the same structural units, said units 2 and 6 of FIG. 1 need to be modified to the structure of FIG. 2 or FIG. 3. This prevents various problems in design changes, which seems to be impossible as a practical matter.

SUMMARY OF THE INVENTION

An object of the present invention is therefore to provide a novel error correcting system for DPSK which is free from the above mentioned disadvantages of the prior art systems.

The present system is composed of: an encoder unit including a differential encoder, an error correcting encoder and a differential decoder; a decoder unit including a differential encoder, an error correcting decoder and a differential decoder; and a transmission or storage medium disposed between said respective units and including DPSK modulator and demodulator.

BRIEF DESCRIPTION OF THE DRAWINGS

Now the present invention will be described in greater detail in conjunction with the accompanying drawings, in which:

FIGS. 1, 2 and 3 are block diagrams of conventional error correcting systems;

FIG. 4 is a block diagram of an embodiment of the present invention;

FIG. 5 is a block diagram of a differential encoder;

FIG. 6 is a block diagram of a differential decoder; and

FIG. 7 is a block diagram showing the embodiment as applied to a QPSK system.

DESCRIPTION OF THE PREFERRED EMBODIMENT

In FIG. 4, like reference numerals denote like structural elements shown in FIG. 1, with the primed ones denoting the corresponding structural elements on the receiver side.

Reference numerals 10 and 13 designate an encoder unit and a decoder unit, respectively, which are newly proposed in the present invention. As is well-known, when the phase positions $0°, a°, 2a°, \ldots,$ and $(m-1)a°$ (where $a° = 360°/M$) in an M-ary DPSK system are represented by $0, 1, 2, \ldots,$ and $(M-1)$, the differential encoder 3 and differential decoder 8 can be shown as in FIGS. 5 and 6, respectively. In FIGS. 5 and 6, reference numerals 16 and 16' designate registers for storing one phase datum, and numerals 17 and 17' respectively designate a modulo-M adder and a modulo-M subtractor.

FIGS. 5 and 6 show that the differential encoder and the differential decoder function to perform mutually reverse transformations.

Now with reference to FIG. 4, a transmission data sequence is differentially encoded first by a differential encoder 3 in an encoder unit 10, and then it is added with check data in an error correcting encoder 1. After it has been subjected to the transformation of differential decoding in a differential decoder 8, it is transmitted to a modulator unit 2. The data sequence is, similarly to the system shown in FIG. 1, transmitted from the modulator unit 2, through a transmission medium 5 and a demodulator unit 6 to a decoder unit 13.

In some cases, the modulator unit 2, transmission medium 5 and demodulator unit 6 are called a transmission medium including DPSK modulator and demodulator.

If no error is introduced in the transmission medium 5, the input data sequence given to the modulator unit 2 and the output data sequence given from the demodulator unit 6 are exactly idential. However, if an error is introduced, a register in a differential decoder 8' for storing the above-mentioned one digit causes the one digit to affect the next clock with the result that the error is doubled. A differential encoder 3" of the decoder unit 13 which has received the data sequence having the error doubled, restores the received data sequence to the previous data sequence which is inputed to the differential decoder 8'.

However, at this moment, attention should be paid to the following points. In the differential decoder 8', if the input data sequence $a_0, a_1, a_2, \ldots, a_n, \ldots$ is represented by $A(D) = a_0 + a_1 D + a_2 D^2 + \ldots + a_n D^n + \ldots$, the output data sequence $b_0, b_1, b_2, \ldots, b_n, \ldots$ is represented by $B(D) = b_0 + b_1 D + b_2 D^2 + \ldots + b_n D^n + \ldots$, and the initial data (that is, the data stored initially in said register for storing one phase data) is represented by c, then, the following relationship is estabilshed as will be apparent from FIG. 6:

$$B(D) = A(D) \cdot (1 - D) - c \ ((\mathrm{mod}\ M)) \tag{1}$$

On the other hand, if the input data sequence, output data sequence and initial data are represented in the differential encoder 3" by $E(D)$, $F(D)$ and g, respectively, in the same manner as the case of the differential decoder 8', the following relationship is established by the structure of FIG. 5:

$$F(D) = E(D)/(1-D) + g/(1-D) \ (\mathrm{mod}\ M) \tag{2}$$

Therefore, if the initial data in the differential decoder 8' and differential encoder 3", respectively, are represented by c and g, the output data sequence $F(D)$ obtained after the data sequence $A(D)$ has been input to the differential decoder 8' and its output data sequence has been in itself input to the differential encoder 3", can be represented in the following form:

$$\begin{aligned} F(D) &= \{A(D) \cdot (1 - D) - c\}/(1 - D) + g/(1 - D) \\ &= A(D) + (g - c)/(1 - D) \\ &= A(D) + (g - c) + (g - c)D + \\ &\quad (g - c)D^2 + \ldots + (d - D)D^n + \ldots \\ &\quad (\mathrm{mod}\ M) \end{aligned}$$

It is seen that the output data sequence $F(D)$ given from the differential encoder 3" is a data sequence formed by always adding in modulo M the initial data difference $(g - c)$ to the input data sequence $A(D)$ for the differential decoder 8', and that the phase references are different by the amount of $(g - c)$ between the input and output data sequences $A(D)$ and $F(D)$.

Except for the amount of the initial data difference, the respective data sequences are equal to each other, with the erroneous phase-encoded data constituting the only erroneous data introduced in the transmission medium. Thus, the errors are never expanded in the present system. For the same reasons, the output data sequence given from the differential encoder 3" is a data sequence formed by always adding in modulo M the amount of the initial data difference to the input data sequence for the differential decoder 8. In other words, the output data sequence given from the error correcting encoder 1 and the input data sequence given to the error correcting decoder 9 are, similarly to the prior art system shown in FIG. 2 or 3, different only in the phase reference, and except for the amount of the difference, the respective data sequences are different only with respect to the erroneous data introduced in the transmission medium 5 without expansion of the errors, and are exactly the same data sequences with respect to the remaining data.

Therefore, with respect to the error correcting codes, it can be assumed as in the case of FIGS. 2 and 3 that the conventional codes usable even without the absence of the coincidence of the phase references are employed. Then, the error correcting decoder 9 is required to correct only the erroneous data produced in the transmission medium. The difference in the phase references can be removed by disposing the differential encoder 3 and the differential decoder 8", respectively, outside of the error correcting encoder 1 and the error correcting decoder 9.

More particularly, when the input and output data sequences and initial data of the differential decoder 8" are represented respectively by $A(D)$, $B(D)$ and c, and when the input and output data sequences and initial data of the differential encoder 3 are represented respectively by $E(D)$, $F(D)$ and g, as discussed previously, equations (1) and (2) are established. In addition, if the difference in the phase references between the input data sequence $A(D)$ and the input data sequence $E(D)$ is represented by h, the following relationship is established:

$$\begin{aligned} A(D) &= F(D) + h + hD + hD^2 + \ldots + hD^n + \ldots \\ &= F(D) + h/(1 - D) \quad (\mathrm{mod}\ M) \end{aligned} \tag{3}$$

From equations (1), (2) and (3), the following equation is satisfied:

$$\begin{aligned} B(D) &= A(D) \cdot (1 - D) - c \\ &= \{F(D) + h/(1 - D)\} \cdot (1 - D) - c \\ &= [\{E(D)/1 - D) + g/(1 - D)\} + \\ &\quad h/(1 - D)] \cdot (1 - D) - c \\ &= E(D) + (g + h - c) \quad (\mathrm{mod}\ M) \end{aligned} \tag{4}$$

Consequently, it can be readily seen that the output data sequence $B(D)$ given from the differential decoder 8" is entirely identical to the input data sequence $E(D)$ for the differential encoder 3 except for the data at the very initial time point, and the difference h in the phase references is removed.

Therefore, so long as the errors introduced in the transmission medium 5 come within the error correcting capability of the employed error correcting codes, the input data sequence given to the encoder unit 10 and the output data sequence given from the decoder unit 13 are exactly identical data sequences except for the data at the very initial time point.

Now, as one example of the utilization of the conventional codes usable even in the absence of the coincidence of the phase references, two binary error correcting codes employed independently in the DPSK system will be described in detail in connection to FIG. 7. In FIG. 7, like reference numerals denote like structural elements shown in FIG. 3. Each of the respective phase-encoded data 0, 1, 2 and 3 in the DPSK system can be represented as a 2-bit data, and normally at the input and output of the modem the data are handled as represented in the form of the so-called Gray code. More particularly, the respective phase-encoded data of 0, 1, 2 and 3 are handled as represented by 2 bits in the form of 00, 01, 11 and 10, respectively. Therefore, it is assumed that in the encoder unit 10' and the decoder unit 13' also the respective phase-encoded data 0, 1, 2 and 3 are represented in the form of the Gary code. In this case, the adders and subtractors of modulo 4 contained in the differential encoders 3, 3' and 3" and in the differential decoders 8, 8' and 8" are adapted to output the results of the calculation according to the following calculation tables 1 and 2.

TABLE 1

| PHASE-ENCODED DATA a | PHASE-ENCODED DATA b | | | |
|---|---|---|---|---|
| | 0 | 1 | 2 | 3 |
| | 00 | 01 | 11 | 10 |
| 0   00 | 00 | 01 | 11 | 10 |
| 1   01 | 01 | 11 | 10 | 00 |
| 2   11 | 11 | 10 | 00 | 01 |
| 3   10 | 10 | 00 | 01 | 11 | a + b (mod 4)

TABLE 2

| PHASE-ENCODED DATA a | PHASE-ENCODED DATA b | | | |
|---|---|---|---|---|
| | 0 | 1 | 2 | 3 |
| | 00 | 01 | 11 | 10 |
| 0   00 | 00 | 10 | 11 | 01 |
| 1   01 | 01 | 00 | 10 | 11 |
| 2   11 | 11 | 01 | 00 | 10 |
| 3   10 | 10 | 11 | 01 | 00 | a − b (mod 4)

In FIG. 7, the input bit sequences fed to the error correcting encoders 1"-1 and 1"-2 are represented by P'i and Q'i, respectively, and the output bit sequences after the check bits have been added are represented by Pi and Qi, respectively, Then, the input bit sequences given to the error correcting decoders 9"-1 and 9"-2, respectively, will vary depending upon the difference between the initial data given to the differential decoder 8 and the differential encoder 3", respectively, and they can be represented as shown in the following table 3. This table 3 can be easily derived by carrying out the addition in modulo 4 of any arbitary data represented by 2 bits and the above-mentioned difference between the initial data i (=0, 1, 2, 3) assuming that M=4 is satisfied, and by checking how the 2 bits are varied on the basis of table 1.

In table 3, an asterisk (*) represents that the sequence is a sequence having some errors added only on the transmission medium 5, while a bar (-) represents that the sequence is a sequence having its every data bit inverted.

TABLE 3

| Difference between the initial phase-encoded data | Input to the decoder 9"-1 | Input to the decoder 9"-2 |
|---|---|---|
| 0 | Pi* | Qi* |
| 1 | Qi* | $\overline{Pi}$* |
| 2 | $\overline{Pi}$* | $\overline{Qi}$* |
| 3 | $\overline{Qi}$* | Pi* |

As will be seen from table 3, the input bit sequences given to the error correcting decoders 9"-1 and 9"-2 are any one of Pi*, $\overline{Pi}$*, Qi* and $\overline{Qi}$*. However, in the case of employing the conventional binary error correcting codes, if the errors introduced in the transmission medium 5 come within the error correcting capability, the above-mentioned input bit sequences Pi*, $\overline{Pi}$*, Qi* and $\overline{Qi}$* become Pi, $\overline{Pi}$, Qi and $\overline{Qi}$, respectively, after the decoding operation.

As described above, P'i and Q'i represent the input bit sequences fed to the error correcting encoders 1"-1 and 1"-2. Therefore, assuming that the output bit sequences given from the error correcting decoders 9"-1 and 9"-2 are the bit sequences Q'i and P'i free of the check digits, the output data sequences obtained from the error correcting decoders 9"-1 and 9"-2 are, the data sequences obtained by adding in modulo 4, +3 to all the data in the input data sequences for the error correcting encoders 1"-1 and 1"-2 from the tables 1 and 3.

Since this difference in the phase reference can be removed by the differential encoder 3 and the differential decoder 8" as mentioned previously, the input data sequence to the encoder unit 10' becomes entirely identical to the output data sequence given from the decoder unit 13'. This fact is similarly applied to the case where the output bit sequences given from the error correcting decoders 9"-1 and 9"-2 are a different combination of bit sequences.

With regard to the error correcting encoders 1"-1 and 1"-2 and error correcting decoders 9"-1 and 9"-2 of FIG. 7, reference is made to FIG. 5.05 on page 125 and FIG. 5.03 or page 123, respectively, of the book entitled *Algebraic Coding Theory* by Elwyn R. Berlekamp, published in 1968 by McGraw-Hill, Inc.

As described in detail above, the present error correcting system provides a very efficient system while allowing even the conventional DPSK modulator and demodulator to be utilized without any structural changes. While the present invention has been described in detail above as applied specifically to the QPSK system, it will be easily understood that the present invention can provide a similarly effective error correction system for the conventional M-ary error correcting codes based on the modulo-M calculation.

What is claimed is:

1. An error correcting system for differential phase-shift-keying comprising an encoder unit including a differential encoder for differentially encoding an input data sequence, an error correcting encoder for adding a check digit sequence to the differentially encoded data sequence, and a differential decoder for differentially decoding the data sequence added with the check digit sequence; a decoder unit including a differential encoder for differentially encoding a received data sequence, an error correcting decoder for correcting error digits contained in the differentially encoded received data sequence, and a differential decoder for differentially decoding the output data sequence from the error correcting decoder; and a transmission medium disposed between said encoder and decoder units and including a differentially encoded phase-shift-keying modulator unit and a differentially encoded phase-shift-keying demodulator unit.

2. An error correcting encoder unit for differential phase-shift-keying including: a differential encoder for differentially encoding an input data sequence; an error correcting encoder for adding a check digit sequence to the differentially encoded data sequence; and a differential decoder for differentially decoding the data sequence added with the check digit sequence.

3. An error correcting decoder unit for differential phase-shift-keying including: a differential encoder for differentially encoding a received data sequence; an error correcting decoder for correcting error digits contained in the differentially encoded received data sequence; and a differential decoder for differentially decoding the output data sequence given from the error correcting decoder.

* * * * *